(12) United States Patent
Chen et al.

(10) Patent No.: US 8,922,984 B2
(45) Date of Patent: *Dec. 30, 2014

(54) PORTABLE COMPUTER

(75) Inventors: Chun-Chien Chen, New Taipei (TW);
Chu-Chia Tsai, New Taipei (TW);
Cheng-Shing Liu, New Taipei (TW);
Tai-Chuan Chen, New Taipei (TW);
Ming-Ju Hsieh, New Taipei (TW);
Tien-Chung Tseng, New Taipei (TW);
Chien-Yuan Lai, New Taipei (TW);
Hung-Chih Chen, New Taipei (TW);
Shang-Mao Lee, New Taipei (TW);
Cheng-Hsiang Chuang, New Taipei (TW)

(73) Assignee: Wistron Corporation, New Taipei (TW)

( * ) Notice: Subject to any disclaimer, the term of this patent is extended or adjusted under 35 U.S.C. 154(b) by 215 days.

This patent is subject to a terminal disclaimer.

(21) Appl. No.: 13/542,769

(22) Filed: Jul. 6, 2012

(65) Prior Publication Data

US 2013/0128440 A1    May 23, 2013

Related U.S. Application Data

(60) Provisional application No. 61/561,312, filed on Nov. 18, 2011.

(30) Foreign Application Priority Data

Feb. 24, 2012 (TW) .............................. 101106214 A

(51) Int. Cl.
*G06F 1/16* (2006.01)

(52) U.S. Cl.
CPC .................................... *G06F 1/1679* (2013.01)
USPC .................. 361/679.26; 345/169; 455/575.4; 211/181.1

(58) Field of Classification Search
USPC ......... 345/173, 174, 204, 690, 168, 177, 520, 345/156, 158, 650, 161, 169; 361/679.01, 361/679.3, 679.16, 679.09, 679.26, 679.02, 361/679.4, 679.21, 679.27, 679.55, 679.22, 361/679.06, 679.12, 679.15, 679.17; 455/566, 575.1, 41.1, 41.2, 575.4; 200/534, 295, 5 A, 512, 52 R; 174/250, 174/254, 261; 248/121, 206.5, 448, 122.1, 248/398, 688, 188.8, 456, 297.11, 558, 551, 248/459, 161, 310, 131, 146; 211/87.01, 211/59.1, 59.3, 45, 59.2, 74, 181.1, 187

See application file for complete search history.

(56) References Cited

U.S. PATENT DOCUMENTS

| 7,184,263 | B1 | 2/2007 | Maskatia | |
|---|---|---|---|---|
| 2006/0077622 | A1 | 4/2006 | Keely et al. | |
| 2007/0030634 | A1 | 2/2007 | Maskatia | |
| 2010/0309612 | A1 | 12/2010 | Liang et al. | |
| 2013/0128442 | A1* | 5/2013 | Tseng et al. | 361/679.09 |
| 2013/0128443 | A1* | 5/2013 | Tseng et al. | 361/679.12 |
| 2014/0043749 | A1* | 2/2014 | Lai et al. | 361/679.27 |

FOREIGN PATENT DOCUMENTS

| CN | 2174715 Y | 8/1994 |
|---|---|---|
| TW | 426174 U | 3/2001 |
| TW | 566583 U | 12/2003 |
| TW | 584227 U | 4/2004 |
| TW | M243748 U | 9/2004 |
| TW | CN1784133 A | 6/2006 |
| TW | 200707220 | 2/2007 |
| TW | M323952 U | 12/2007 |
| TW | 200815963 A | 4/2008 |
| TW | 200827832 A | 7/2008 |
| TW | M367554 U | 10/2009 |
| TW | M398651 U | 2/2011 |
| TW | 201128355 A | 8/2011 |

* cited by examiner

OTHER PUBLICATIONS

Taiwan Patent Office, Office Action of corresponding Taiwan Application No. 101106214 (including 6 pages English translation of marked portion of pp. 1-8 of Office Action), issued Jun. 17, 2014, 16 pages.

Primary Examiner — Hung Duong
(74) *Attorney, Agent, or Firm* — Alan D. Kamrath; Kamrath IP Lawfirm, P.A.

(57) ABSTRACT

A portable computer includes a base, a display module, and a support element. The base includes a first area, a second area, and a sliding assembly disposed at a substantially central position of the second area. The sliding assembly includes a sliding element and a guiding structure, and the sliding element can move along the guiding structure to slide at least in the second area. The display module includes a connecting end combined with the sliding element and a support plane. The support element includes a first area pivotally connected to the support plane and a second end pivotally connected to a rear end of the base. When the display module is opened, the display module further rotates around the first fixed end and moves the connecting end simultaneously. Then, the display module is supported by the support element to keep a suitable tilted angle.

35 Claims, 11 Drawing Sheets

PORTABLE COMPUTER

CROSS REFERENCE

The present application claims benefit of U.S. Provisional Application No. 61/561,312 filed on Nov. 18, 2011.

BACKGROUND OF THE INVENTION

1. Field of the Invention

The present relates to a portable computer and, more particularly, to a portable computer which can move a display towards a user and keep the display at a tilted angle.

2. Description of the Related Art

Computing devices have become an indispensable part of our daily life. With the fast development of touch technologies, most hand-held devices or electronic devices, such as a tablet PC, a smart phone, and a PDA, now provide touch panels instead of a mouse or a keyboard as input devices, and these devices are equipped with an operating system supporting touch functions to enable intuitive and convenient operations.

As notebook PCs are usually equipped with QWERTY keyboards and touch pads for input functions and as they also use an operating system which does not support touch functions or interfaces which cannot recognize touch gestures, few notebook PCs provide touch functions or designs in the past. However, as software vendors are rolling out new operating systems which can support touch functions and as people are becoming familiar with touch gestures required to operate tablet PCs or smart phones, it is now necessary for manufactures to provide touch functions on notebook PCs or even transform their notebook PCs into tablet PCs. Due to a certain weight of the display, and when a user opens the display to a suitable angle relative to the base for touch operations, the display is kept in a fixed position by a reactive torsion of a pivot bearing between the display and the base. However, when the user touches the display, a torque generated by the applied force and the distance between the point of applied force and the pivot bearing would cause the display to vibrate back and forth, making it inconvenient for the user to perform any touch function and to see the display clearly. Furthermore, when the user applies too much force on the display, the display could topple and fall backwards without proper support, and the display could be damaged to discourage the user to perform any touch function.

Therefore, a prior art technique discloses a support arm for supporting and pivotally connecting to the display.

In a prior art technique such as Taiwan Patent No. I316666 (U.S. Pat. No. 7,184,263B1), a portable computer uses a sheet-like support element to support a display and to let the display slide relative to the computer body via guide grooves on both sides of the keyboard to stand upright. However, this design can only be applied for tablet PCs which have their displays faced upwards in a normal state and is not suitable for notebook PCs which usually have their displays faced down and towards a keyboard when not in use. Therefore, the prior art technique is designed specifically for tablet PCs having their display exposed outwardly and allows the user to slide the display to a tilted angle for operations. However, the display is not well protected, since it is exposed in any circumstance.

In another prior art technique such as Taiwan Patent No. 566583, a notebook PC has its display rotatably moved relative to a base via a plurality of connecting rods to change a viewing angle for the user. However, this prior art technique comprises a complicated design which involves the operations of pivoting, linking and sliding and various linkage elements to work. Therefore, it is disadvantageous to assemble and to operate the mechanism. Besides, with a complicated mechanism and exposed support and linkage mechanisms on both sides of the display, it is aesthetically unpleasant, and it is possible to hurt the user if the user's finger accidentally gets pinched between these mechanisms. Additionally, the prior art technique requires reserved spaces for disposing grooves and pivoting mechanisms on both sides of the base, and it also requires additional spaces for disposing support elements on both sides of the display case as well. Thus, the whole thing tends to be bulky and thick, and it could sacrifice the viewable area of the display.

Therefore, it is necessary to provide a structure which can stably support the display and slide the display to a suitable angle for the portable computer.

SUMMARY OF THE INVENTION

It is an object of the present invention to provide a portable computer which can move a display towards a user and keep the display at a tilted angle.

In order to achieve the above object, the present invention discloses a portable computer which comprises a base, a display module, and a support element. The base comprises, between a front end and a rear end, a first area disposed at a front side of the base and a second area disposed at a rear side of the base. The second area has a sliding assembly disposed at a substantially central position of the second area, and the sliding assembly comprises a sliding element and a guiding structure. The sliding element can move along the guiding structure to slide at least in the second area. The display module comprises a connecting end combined with the sliding element, a display face, and a support plane opposite to the display face. The support element comprises a first fixed end pivotally connected to the support plane of the display module and a second fixed end pivotally connected to the rear end of the base. Therefore, when the display module is opened and rotated to a suitable angle relative to the base via the second fixed end of the support element, the display module further rotates around the first fixed end with the first fixed end serving as a pivot point and simultaneously drives the connecting end to move from the second area towards the first area to a suitable position along with the sliding element. Then, and then the display module is supported by the support element to keep a suitable tilted angle.

In an embodiment of the present invention, the portable computer of the present invention discloses a portable computer comprising a base, a display module, at least one support element and at least one sliding assembly. The base comprises, between a front end and a rear end, a first area disposed at a front side of the base and a second area disposed at a rear side of the base. The display module comprises a connecting end, a display face, and a support plane opposite to the display face. Each support element comprises a first fixed end pivotally connected to a plane of the display module other than the display face and a second fixed end pivotally connected to the rear end or a proximity of the rear end of the base. Each sliding assembly comprises a sliding element and a guiding structure. The guiding structure is at least disposed in the second area of the base. The sliding element is combined with the connecting end of the display module, and the sliding element can slide along the guiding structure. Therefore, when the display module is opened and rotated to a suitable angle relative to the base via the second fixed ends of the at least one support element, the display module further rotates around the first fixed ends of the at least one support element with the first fixed ends serving as a pivot point and simultaneously drives the connecting end to move from the second area towards the first area to a suitable position along with the sliding element. Then, the display module is supported by the at least one support element to keep a suitable tilted angle.

Through the design of the present invention, a user can turn the display module relative to the base to slide the connecting end of the display module towards the user to a suitable tilted angle via interactions between various pivoting elements and connecting rods. The display module is also supported by the support element to provide a better viewing or operating effect for the user.

DETAILED DESCRIPTION OF THE PREFERRED EMBODIMENTS

The advantages and innovative features of the invention will become more apparent from the following detailed description when taken in conjunction with the accompanying drawings.

Figure 1:
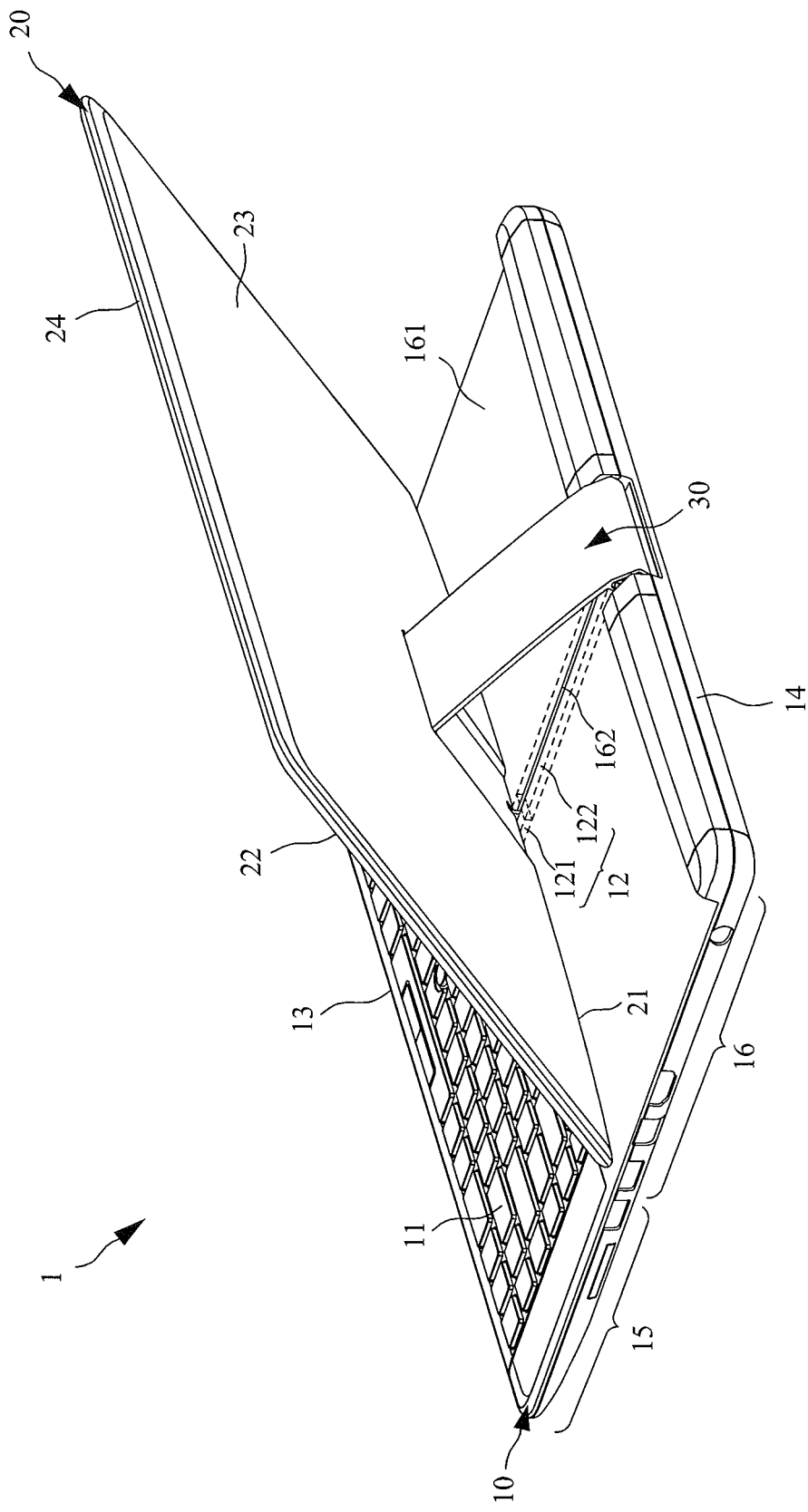
FIG. 1 illustrates a view of a portable computer of the present invention.
Figure 2:
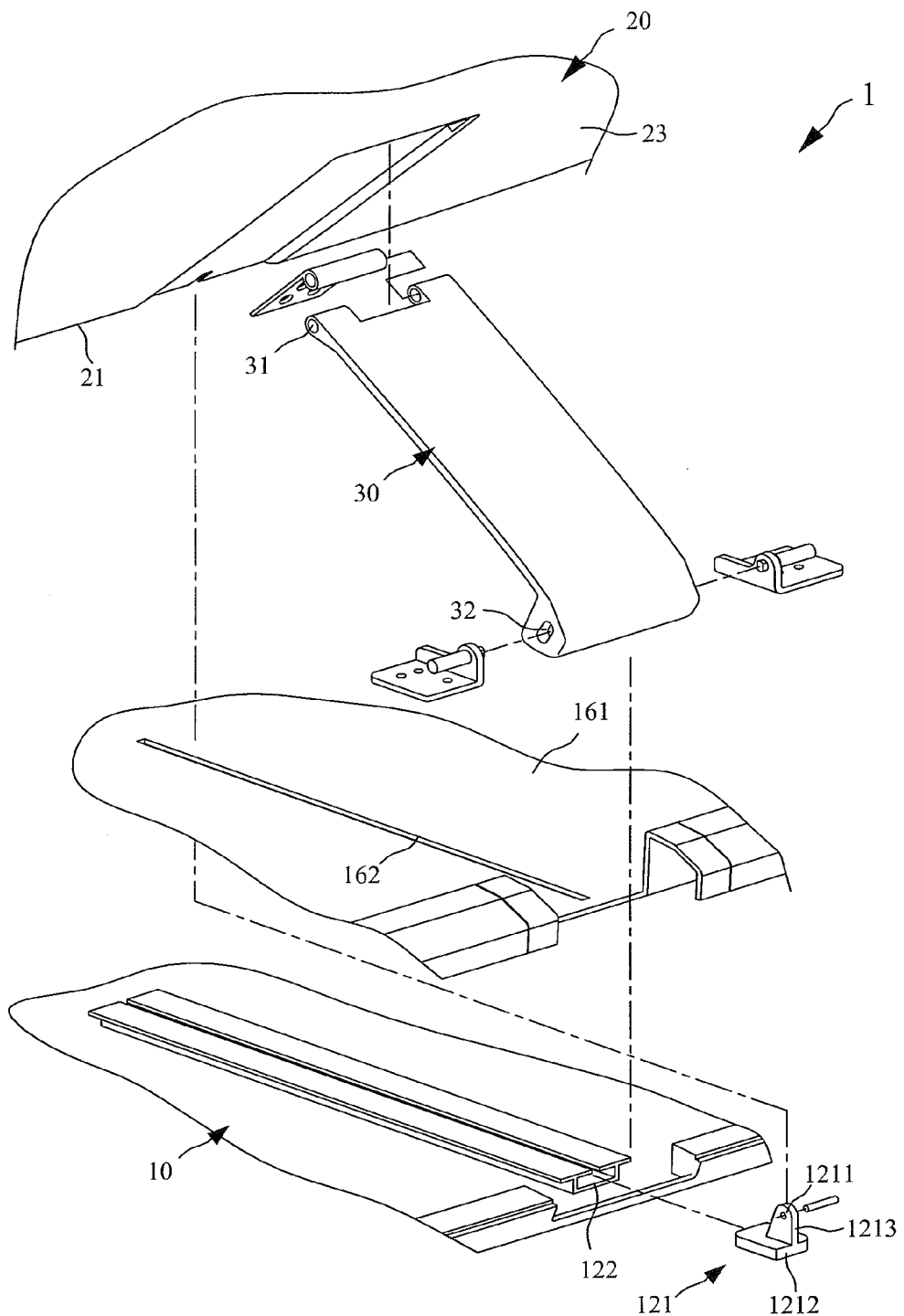
FIG. 2 illustrates a partial explosive view of a first embodiment of the portable computer of the present invention.

Please refer to both FIG. 1 and FIG. 2. FIG. 1 illustrates a view of a portable computer 1 of the present invention; and FIG. 2 illustrates a partial explosive view of a first embodiment of the portable computer 1. In an embodiment of the present invention, the portable computer 1 can be a notebook PC, but according to various application types, the portable computer 1 can also be a tablet PC, a netbook or other electronic devices comprising display modules.

As shown in FIG. 1 and FIG. 2, the portable computer 1 comprises a base 10, a display module 20, and a support element 30. The interior of the base 10 is for disposing main computing components and related electronic components. The top of the base 10 is segmented into a first area 15 and a second area 16 between a front end 13 and a rear end 14. The first area 15 is disposed near the front end 13, and the second area 16 is disposed near the rear end 14. The first area 15 is provided for disposing a keyboard 11 or/and other input devices, such as a touch pad or a track point, and the second area 16 comprises a sliding assembly 12. In other embodiments, the sliding assembly 12 can extend forward to a part or all of the first area 15. It is noted that the sliding assembly 12 can be disposed in a central portion of the second area 16 or a substantially central portion of the second area 16.

The sliding assembly 12 comprises a sliding element 121 and a guiding structure 122. The sliding element 121 combines sliding and pivotally connecting functions. The sliding element can move along the guiding structure 122 to slide in the second area 16 between the rear end 14 of the base and the keyboard 11 with respect to the base 10. A slit 162 is disposed in the middle of the surface 161 of the second area 16, and the sliding assembly 12 is disposed at a position at the bottom of the second area 16 corresponding to the slit 162. In other embodiments, the sliding assembly 12 can also extend from the second area 16 to the first area 15, so the slit 162 can be in the surface of the second area 16 and a part or all of the first area 15, and the guiding structure 122 can be correspondingly disposed below the surface of the second area 16 and the first area 15.

The display module 20 comprises a connecting end 21, a display face 22, a support plane 23, and a free end 24. The display face 22 is disposed opposite to the support plane 23, and the connecting end 21 is opposite to the free end 24. The display module 20 is pivotally connected to the sliding element 121 at the central portion of the connecting end 21 via hinges to form a rotatable pivot point and to let the display module 20 rotate relative to the sliding element 121. The display module 20 can have a display screen supporting touch functions disposed in the display face 22 for receiving touch inputs from the user.

The support element 30 comprises a first fixed end 31 and a second fixed end 32. The first fixed end 31 is pivotally connected to the support plane 23 of the display module 20 via hinges to form a rotatable pivot point and to let the display module 20 rotate relative to the support element 30. The second fixed end 32 can be pivotally connected to the rear end 14 of the base 10 via hinges to form another rotatable pivot point and to let the support element 30 rotate relative to the base 10.

As shown in FIG. 2, in an embodiment of the present invention, the sliding element 121 of the sliding assembly 12 comprises a pivoting portion 1211, a sliding portion 1212, and a connecting portion 1213. The connecting end 21 of the display module 20 is rotatably pivoted to the sliding element 121 via the pivoting portion 1211. For instance, the pivoting portion 1211 can be a hinge element without torsion and can be rotated simply by a pin. Alternatively, the pivoting portion 1211 can be a hinge element conventionally disposed between the display module and the base of a laptop and capable of generating torsion or suitable rotation friction. The sliding portion 1212 is connected to the pivoting portion 1211 via the connecting portion 1213, and the guiding structure 122 of the sliding assembly 12 is provided for disposing the sliding portion 1212 of the sliding element 121. In this embodiment, the guiding structure 122 is a groove-like slide rail, and the sliding portion 1212 is a slide block having its size fitted to the guiding structure 122. However, the guiding structure 122 and the sliding portion 1212 can have various shapes or forms as long as they serve the purpose of the present invention.

In order to comply with the uniformity and consistency of the portable computer 1, the guiding structure 122 of sliding assembly 12 is disposed below the surface 161 of the second area 16 of the base 10 and corresponds to the position of the slit 162 to be hidden from the user. The structure of sliding element 121 of the sliding assembly 12 corresponds to the slit 162 in the surface 161 of the base 10 to let the slit 162 have a width smaller than the sliding portion 1212 and not smaller than the connecting portion 1213. The width of the slit 162 can be smaller than the width of the connecting portion 1213 when elastic material, such as flannel, is applied in the structure of the slit. Therefore, the connecting portion 1213 of the sliding element 121 can go through and move along the slit 162, and can let the pivoting portion 1211 protrude out of the surface 161 of the base 10, thereby pivotally connecting the connecting end 21 of the display module 20 and the pivoting portion 1211 with each other. With this implementation, aside from the exposed pivoting portion 1211 of the sliding element 121 and a part of the connecting portion 1213, the other portion of the sliding element 121 and the guiding structure 122 can be hidden below the surface 161 of the base 10. While the exposed pivoting portion 1211 and the surface 161 of the base 10 are spaced apart by the partially exposed connecting portion 1213 to keep a spacing, the display module 20 pivotally connected to the pivoting portion 1211 can rotate smoothly without running into the base 10. Therefore, the present invention can provide a design which is both aesthetically appearing and practical in enabling the operation between the sliding element 121 and the display module 20.

Figure 3:
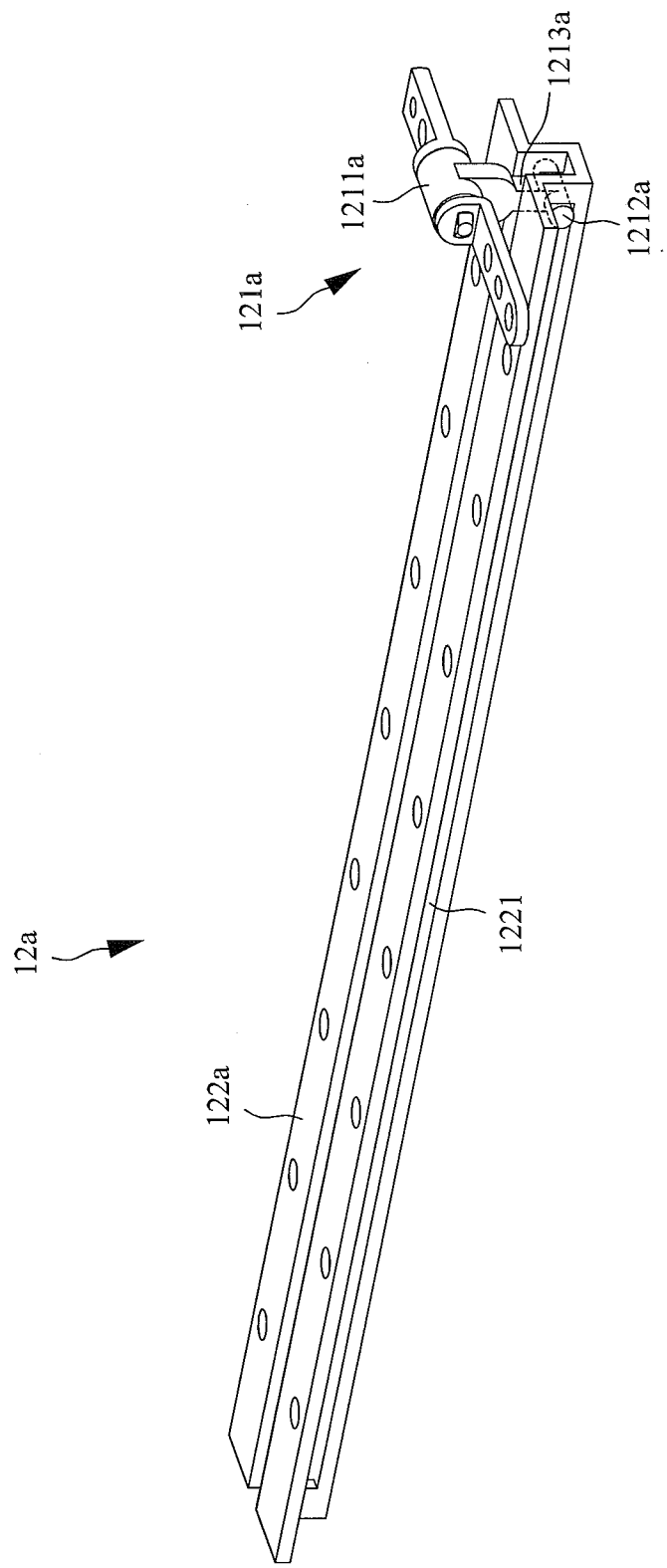
FIG. 3 illustrates a view of a second embodiment of a sliding assembly of the portable computer of the present invention.

Please refer to FIG. 3 for a view of a second embodiment of a sliding assembly 12*a* of the portable computer 1 of the present invention. This embodiment is a variation of the first embodiment. As shown in FIG. 3, in this embodiment, the sliding portion 1212*a* of the sliding element 121*a* has a connecting portion 1213*a* and is a slide column structure formed in an inverse-T structure for sliding in a guiding structure 122*a*, which is a groove-like slide rail having its shape corresponding to that of the sliding portion 1212*a*. In this embodiment, in order to enhance the stability of a sliding movement of the sliding element 121*a* having the pivoting portion 1211*a*, the guiding structure 122*a* comprises at least one hollow groove 1221 for disposing a part of the sliding portion 1212*a* therein. For example, the columns protruding from both sides of the sliding portion 1212*a* (slide column structure) are disposed respectively in hollow grooves 1221 at two opposite sides of the guiding structure 122*a*, and the columns can restrain a moving path and position of the sliding portion 1212*a* to keep the sliding portion 1212*a* stable when it is sliding.

Figure 4:
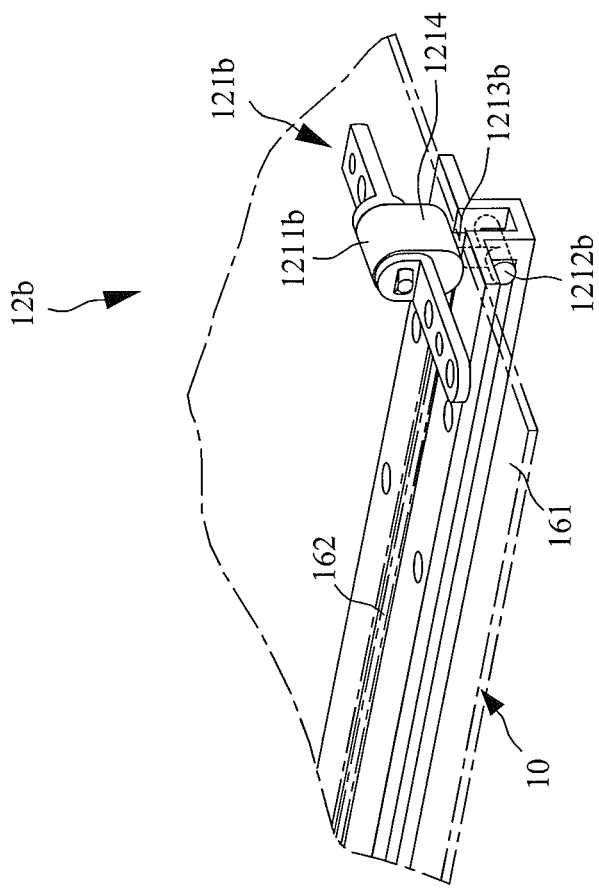
FIG. 4 illustrates a view of a third embodiment of a sliding assembly of the portable computer of the present invention.

Please refer to FIG. 4 for a view of a third embodiment of a sliding assembly 12*b* of the portable computer 1 of the present invention. This embodiment is a variation of the second embodiment. As shown in FIG. 4, in this embodiment, the sliding element 121*b* further comprises at least one retaining portion 1214, and each retaining portion 1214 is disposed between the pivoting portion 1211*b* and the connecting portion 1213*b*. Since a spacing between the exposed pivoting portion 1211*b* and the surface 161 of the base 10 is maintained by the partially exposed connecting end 1213*b*, when the connecting end of the display module (not shown in FIG. 4, please refer to FIG. 2) drives the sliding element 121*b* to slide, the sliding element 121*b* could rotate around the sliding portion 1212*b* with the first fixed end serving as the pivot point, so the sliding element 121*b* may not maintain its sliding movement. Therefore, at least one retaining portion 1214 is disposed for continuously making contact with the surface 161 of the base 10 to keep the spacing between the pivoting portion 1211*b* and the surface 161 and to enhance stability of the sliding movement. In this embodiment, the retaining portion 1214 can be a cam structure or other structures. For example, the retaining portion 1214 can be implemented with a roller structure to help the sliding element 121*b* slide smoothly and reduce a friction generated when the retaining portion 1214 is making contact with the surface 161 of the base 10.

Figure 5A:
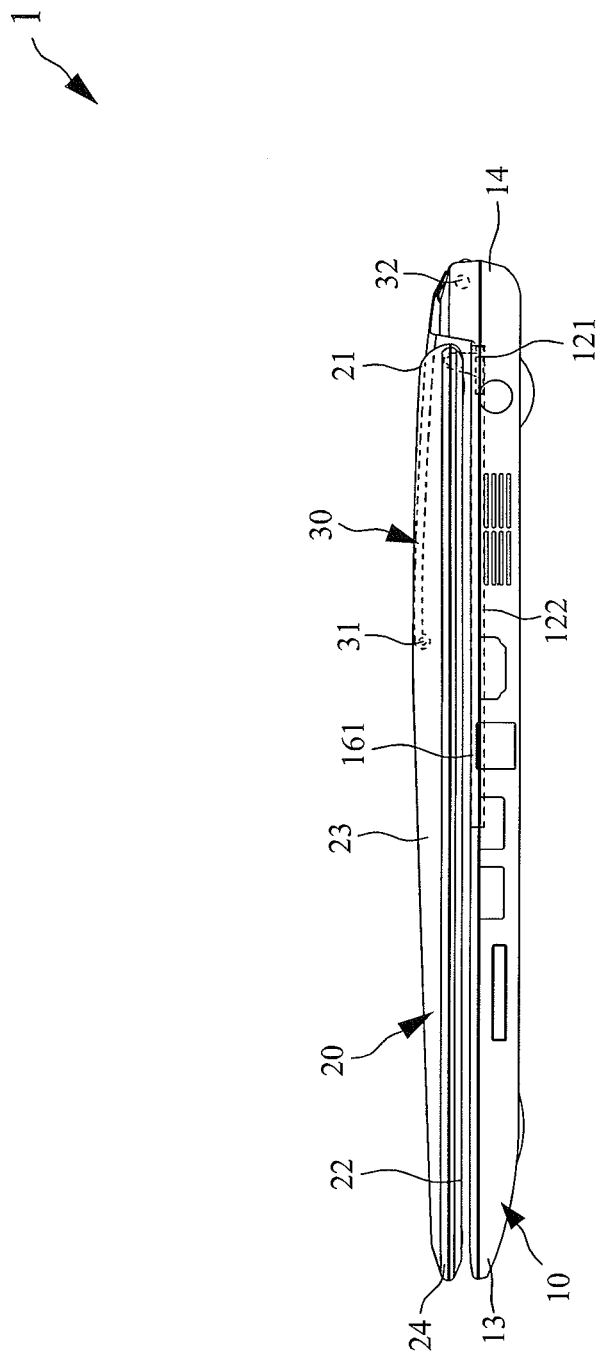
FIG. 5(a) illustrates a view of the first embodiment of the portable computer in a closed state.
Figure 5B:
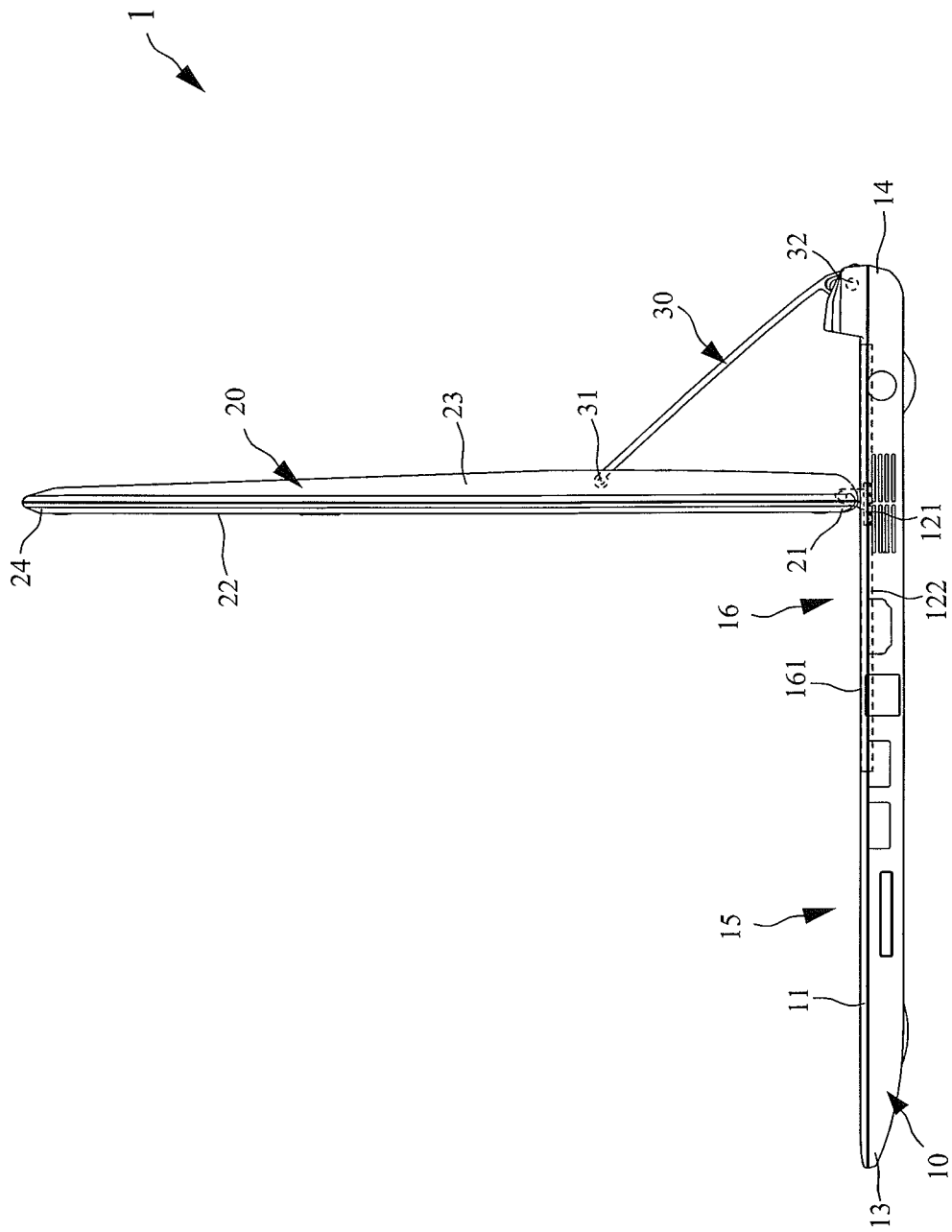
FIG. 5(b) illustrates a view of the first embodiment of the portable computer switched from the closed state to an open state.
Figure 5C:
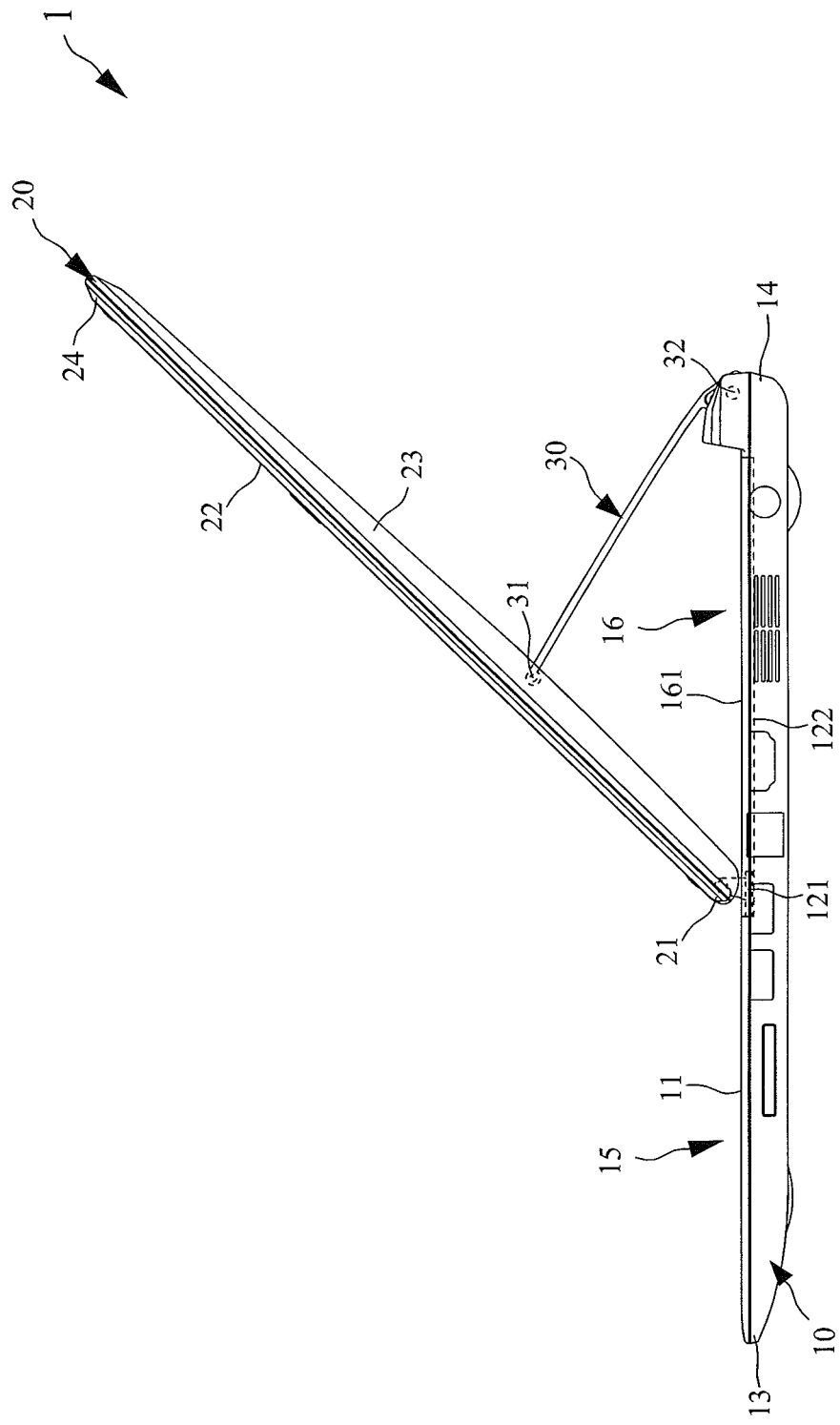
FIG. 5(c) illustrates a view of the first embodiment of the portable computer in the open state.

Please refer to FIGS. 5(*a*), 5(*b*), and 5(*c*). FIG. 5(*a*) illustrates a view of the first embodiment of the portable computer 1 in a closed state; FIG. 5(*b*) illustrates a view of the first embodiment of the portable computer 1 switched from the closed state to an open state; and FIG. 5(*c*) illustrates a view of the first embodiment of the portable computer in the open state.

As shown in FIG. 5(*a*), when the portable computer 1 is in a closed state, the display module 20 overlaps with the base 10 and is pivotally connected to the sliding element 121 via the connecting end 21. At this time, the display face 22 of the display module 20 is facing the base 10. The support element 30 also overlaps with the display module 20 and is pivotally connected to the rear end 14 of the base 10 and the display module 20 via the first fixed end 31 and the second fixed end 32 respectively. In this embodiment, when the portable computer 1 is in the closed state, the connecting end 21 of the display module 20 and the second fixed end 32 of the support element 30 are on different axes substantially parallel with each other, and the length of the support element 30 is longer than the distance between the connecting end 21 of the display module 20 and the first fixed end 31 of the support element 30. However, based on different design requirements, the portable computer 1, while in the closed state, can have the connecting end 21 of the display module 20 and the second fixed end 32 of the support element 30 on the same axis to let the support element 30 have a same length as the distance between the connecting end 21 of the display module 20 and the first fixed end 31 of the support element 30.

As shown in FIG. 5(*b*), when the user exerts a force on the free end 24 opposite to the connecting end 21 of the display module 20 to try to open the display module 20, at first, the display module 20 rotates along with the support element 30 relative to the base 10 with the second fixed end 32 serving as a pivot point. After the display module 20 rotates to a certain angle, and since the support element 30 has its length not smaller than the distance between the connecting end 21 of the display module 20 and the first fixed end 31 of the support element 30, the display module 20 can rotate relative to the support element 30 with the first fixed end 31 of the support element 30 serving as the pivot point. Meanwhile, the display module 20 can rotate relative to the sliding element 121 with the connecting end 21 serving as the pivot point, and the sliding element 121 will drive the connecting end 21 of the display module 20 to slide from the second area 16 towards the first area 15.

As shown in FIG. 5(*c*), when the display module 20 continues to rotate with the first fixed end 31 of the support element 30 serving as the pivot point, and the sliding element 121 drives the connecting end 21 of the display module 20 to slide towards the first area 15 to a suitable position (such as the end of the guiding structure 122), the portable computer 1 is in an open state. At this time, the display module 20 has rotated to a suitable angle relative to the base 10, with the display face 22 of the display module 20 facing the user. The display module 20 is supported by the support element 30 to form a tilted angle relative to the base 10.

On the other hand, when the user tries to close the portable computer 1, the user can pull the free end 24 of the display module 20 to let the display module 20 rotate around the first fixed end 31 of the support element 30 with the first fixed end 31 serving as the pivot point. The connecting end 21 will be driven by the sliding element 121 to slide towards the rear end 14 of the base 10 until it slides to the other end of the guiding structure 122. At this time, the display module 20 rotates around the second fixed end 32 of the support element 30 to return to the closed state.

Therefore, the portable computer 1 only needs to use the sliding assembly 12 disposed at the central position to complete opening/closing functions for the display module without using any complicated linkage elements or structures, thereby reducing the number of required elements and further shrinking the size of the portable computer 1. Besides, the sliding assembly 12 is hidden below the slit 162 of the second area 16 to let the display module 20 stay close to the surface 161 of the second area 16. Thus, the portable computer 1 looks integrated and consistent and eliminates the possibility of hurting the user's finger during opening/closing operations.

Specifically, in the embodiments, the sliding assembly 12 is disposed in the central position of the portable computer 1 and does not take up spaces on both sides of the base 10 and the display module 20. With this design, the user can use only one hand to hold the middle of the free end 24 of the display module 20, which corresponds to the position of the sliding assembly 12, to flip or slide the display module 20 smoothly. During this process, the display module 20 can maintain a stable sliding movement to facilitate operations. Furthermore, the user can initiate the opening process by flipping the display module 20 to let the display module 20 slide to a fixed position automatically. The display module 20 is supported by the support element 30 to keep stable without shaking when the user performs touch operations on the display module 20.

In the previous embodiments, each portable computer 1 comprises a single support element 30 disposed at a central position relative to a sliding assembly 12 to achieve the object of the present invention. However, the present invention can have other implementations depending on different user requirements, effects, and mechanism designs, such as the number of the elements, the placement of the elements, variations of the size, etc., and should be viewed as included in the scope of the present invention.

Figure 6A:
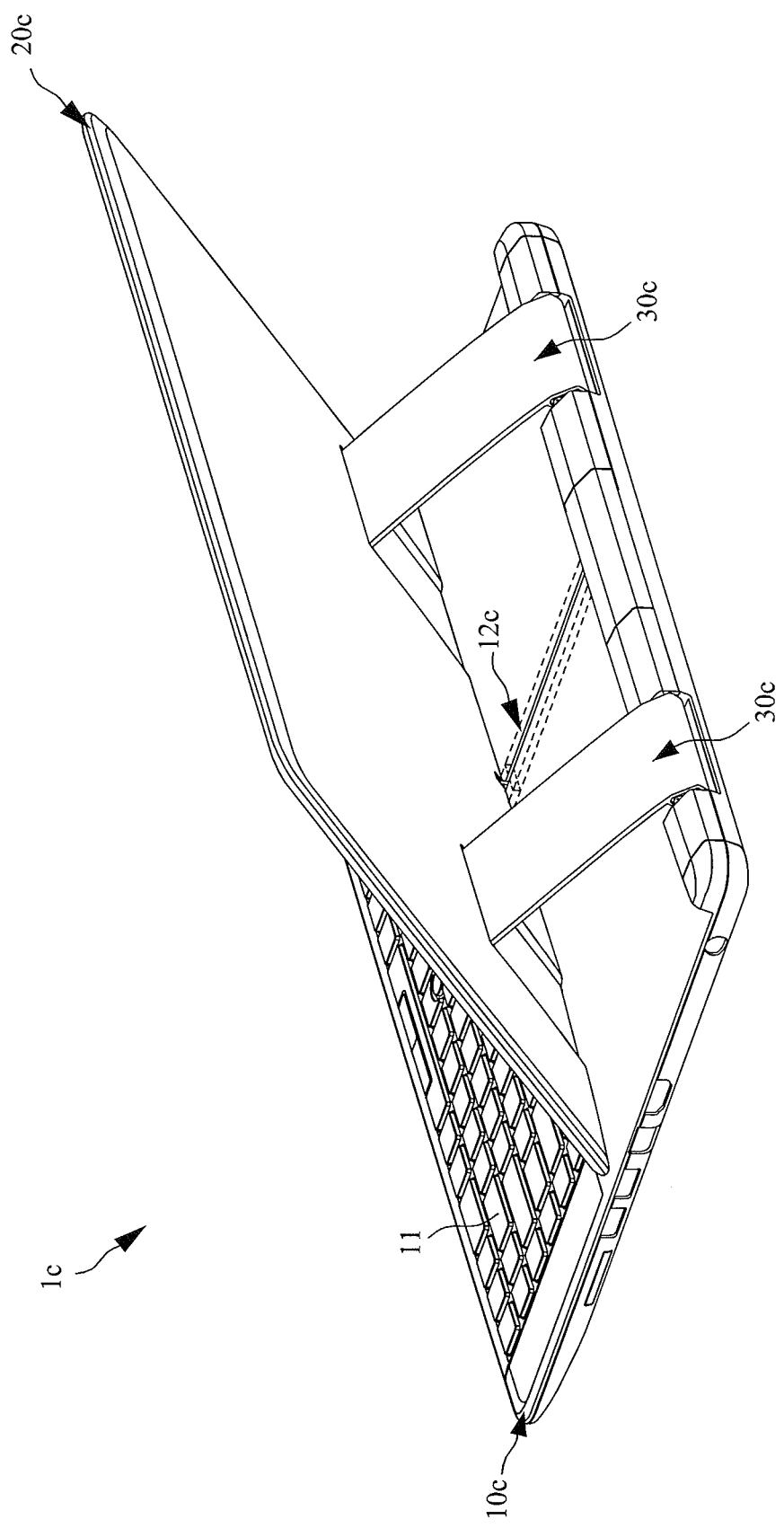
FIG. 6(a) illustrates a view of a fourth embodiment of the portable computer of the present invention.
Figure 6B:
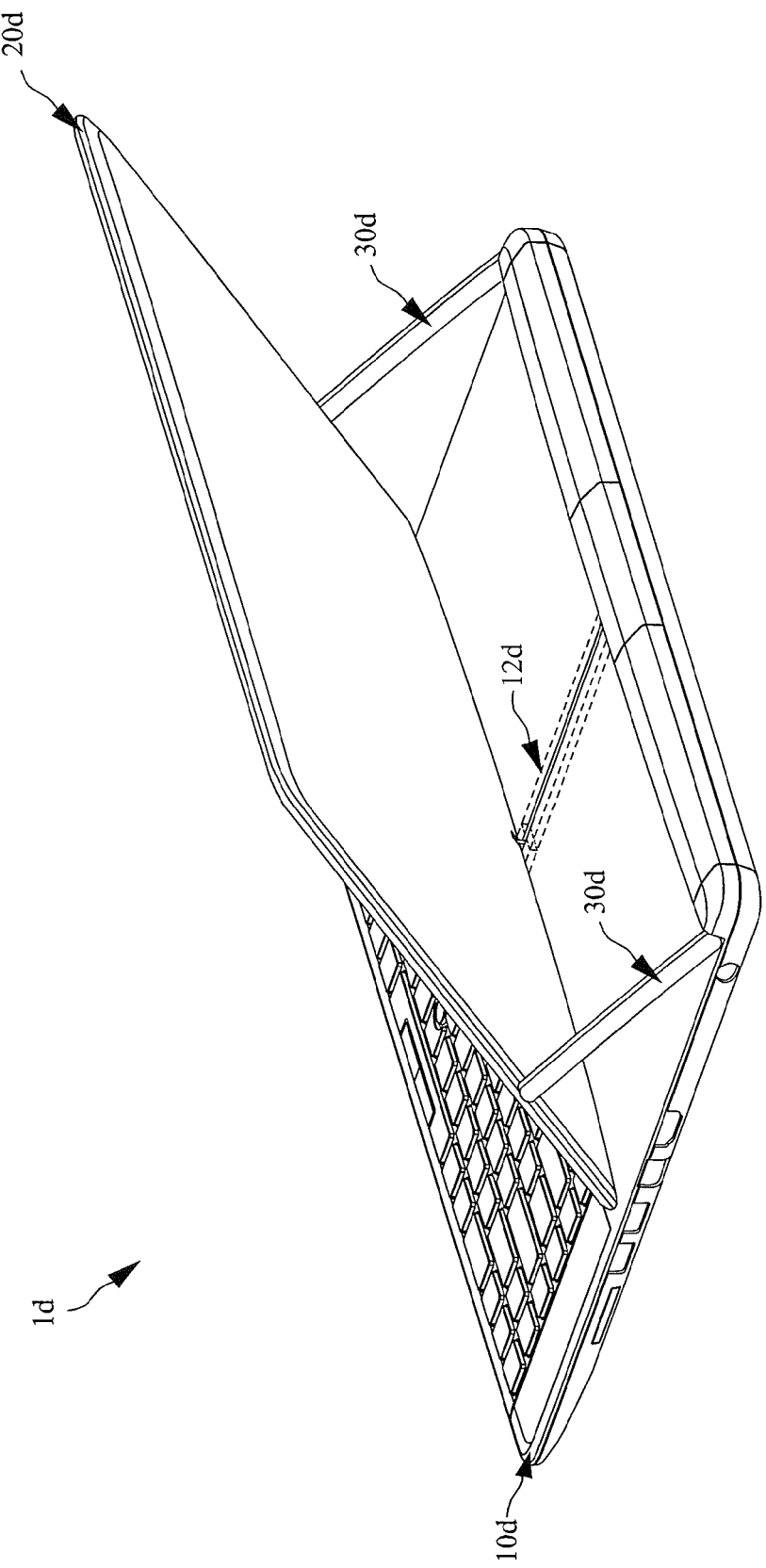
FIG. 6(b) illustrates a view of a fifth embodiment of the portable computer of the present invention.

For example, please refer to both FIG. 6(a) and FIG. 6(b). FIG. 6(a) illustrates a view of a fourth embodiment of the portable computer 1c of the present invention; and FIG. 6(b) illustrates a view of a fifth embodiment of the portable computer 1d of the present invention. Alternatively, the portable computer can use more than one support element to support and stabilize the display module, and the support elements can be disposed at various positions. As shown in FIG. 6(a), in this embodiment, the portable computer 1c comprises two parallelly arranged support elements 30c disposed at two sides of the central sliding assembly 12c respectively to form a symmetrical structure. Each support element 30c has its one end pivotally connected to a plane of the display module 20c other than the display face, and the other end pivotally connected to the rear end of the base 10c. By adding additional support elements (point of support), the present invention can stably support the display module 20c in a sliding movement when it is opening or closing.

Also as shown in and FIG. 6(b), this embodiment is a variation of the previous embodiment, and the portable computer 1d comprises a base 10d, a sliding assembly 12d, and two support elements 30d disposed at two opposite sides near the rear end. The support elements 30d are formed in a long stick-like shape and implemented as connecting rods for reducing the installation space and simplifying the assembling work, thereby enhancing the operations of the display module 20d. However, in other embodiments, the present invention can have various implementations for a plurality of support elements.

Figure 7:
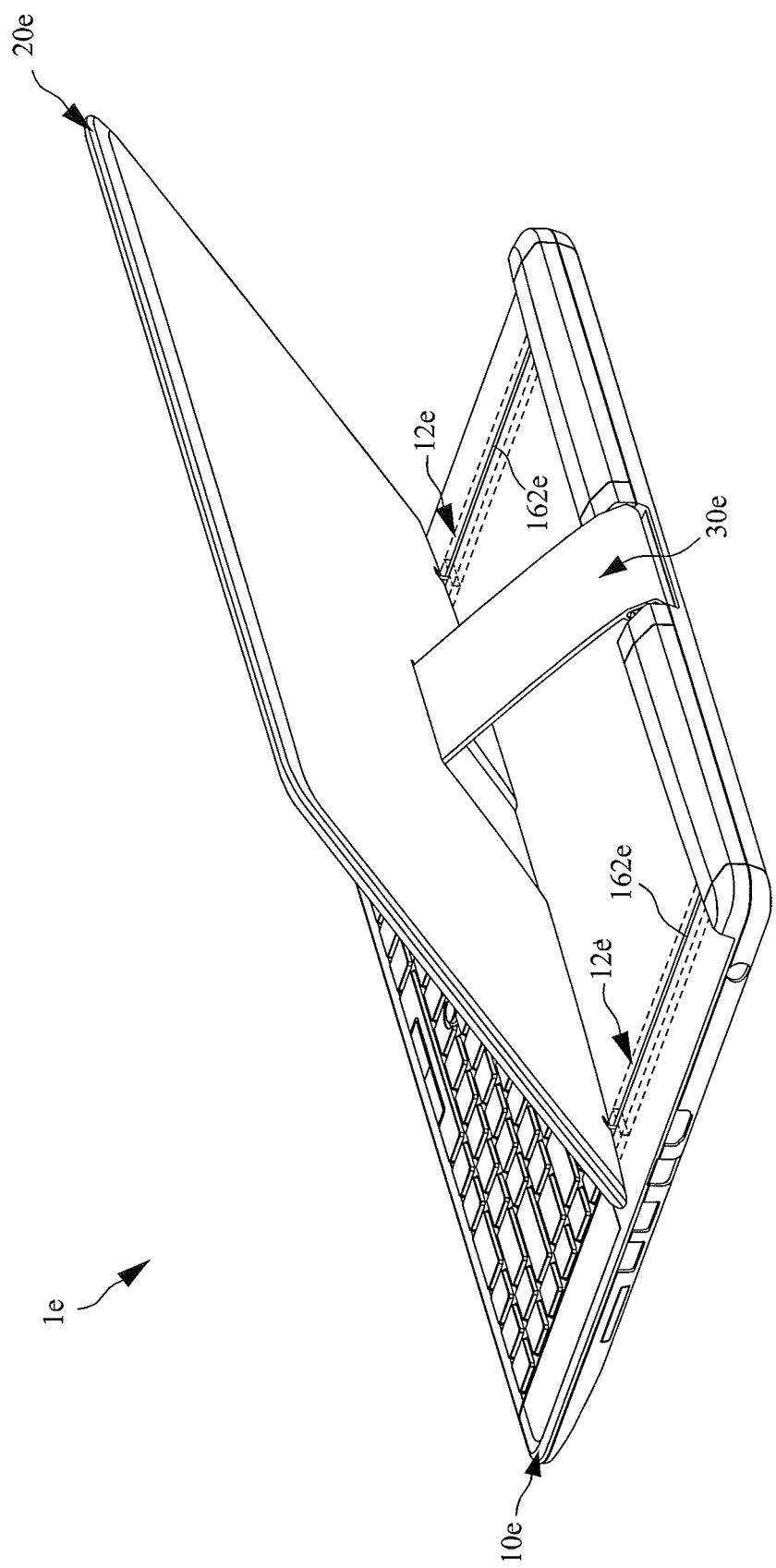
FIG. 7 illustrates a view of a sixth embodiment of the portable computer of the present invention.

Please refer to FIG. 7 for a view of a sixth embodiment of the portable computer 1e of the present invention. Alternatively, in addition to different implementation for the support element, the present invention can also adjust the position of the sliding assembly, the number and the positions of slits in the surface of the base to provide various functions. As shown in FIG. 7, in this embodiment, the portable computer 1e comprises two sliding assemblies 12e disposed at two sides of a single support element 30e respectively, and two slits 162e disposed at the base 10e to correspond to the two sliding assemblies 12e. The two sliding assemblies 12e and the two slits 162e form a parallel symmetric structure. Therefore, when the display module 20e is opening or closing, the two sliding assemblies 12e can help to stabilize the sliding movement of the display module 20e.

Those skilled in the art can easily know that the three embodiments shown in FIG. 6(a) to FIG. 7 can be further combined to form a portable computer which comprises two support elements and two sliding assemblies. Therefore, it will not be described in detail.

Figure 8:
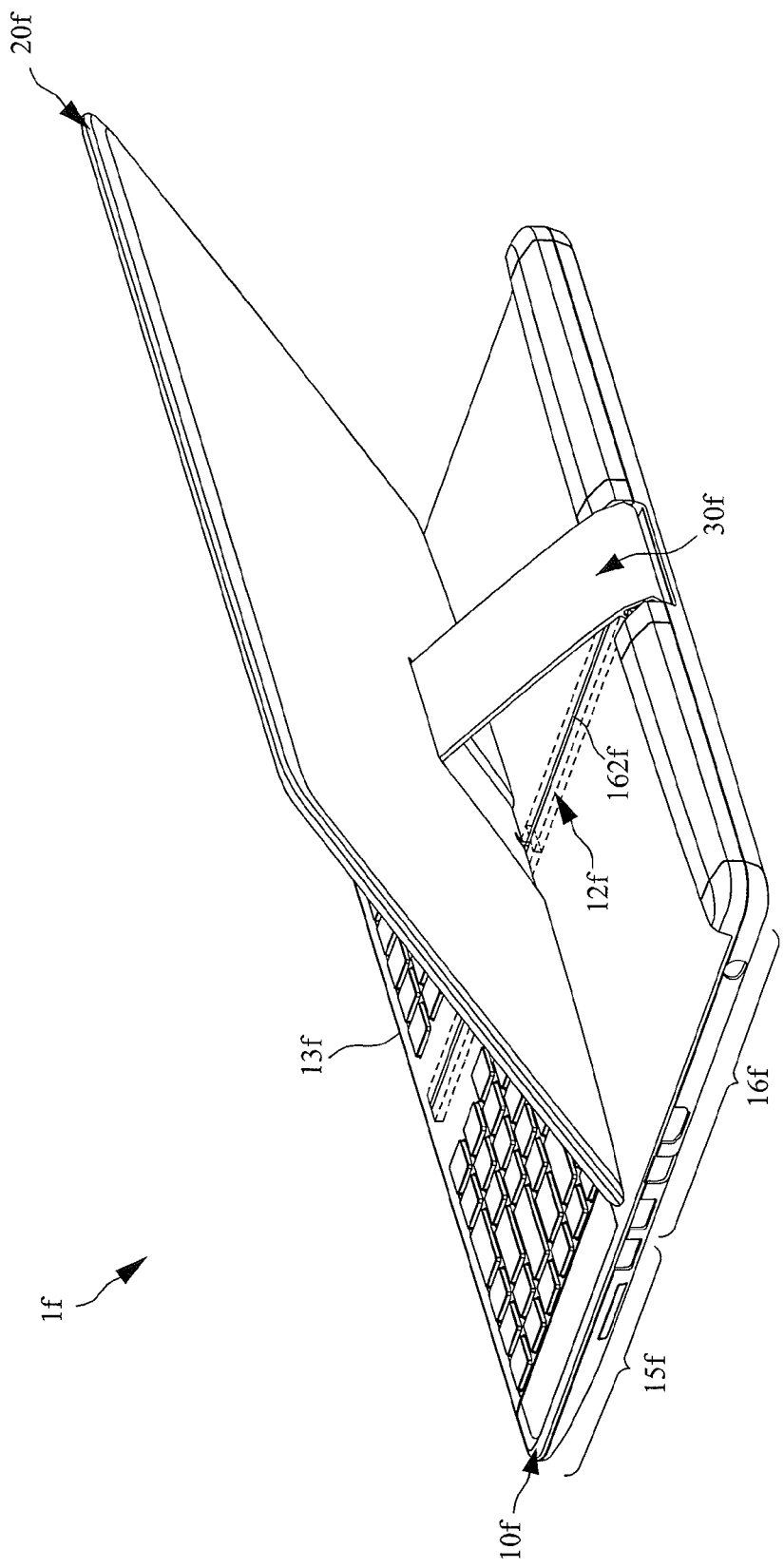
FIG. 8 illustrates a view of a seventh embodiment of the portable computer of the present invention.

Please refer to FIG. 8 for a view of a seventh embodiment of the portable computer of the present invention including a support element 30f. The moving distance of the sliding assembly and the length of the corresponding slit can be adjusted according to various design needs. As shown in FIG. 8, in this embodiment, the sliding assembly 12f of the portable computer 1f and a corresponding slit 162f extend from a second area 16f of a base 10f to a first area 15f of the base 10f for extending a sliding distance of a display module 20f and increasing a range of the tilted angle of the display module 20f. Even more, the display module 20f could lie flat on the base 10f to enhance versatility and capability of the portable computer 1f. Based on applications and user requirements, the sliding assembly 12f and the corresponding slit 162f can choose to extend to a part or all (that is, approaching the position of a front end 13f) of the first area 15f, and the extended slit can have any characteristics shown in FIG. 6(a) to FIG. 7 or their combination.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A portable computer comprising:
   a base comprising, between a front end and a rear end, a first area disposed at a front side of the base and a second area disposed at a rear side of the base, with the second area having a sliding assembly disposed at a substantially central position of the second area, with the sliding assembly comprising a sliding element and a guiding structure, wherein the sliding element moves along the guiding structure to slide at least in the second area;
   a display module comprising a connecting end, a display face, and a support plane opposite to the display face, with the sliding element combined with a substantially central position of the connecting end; and
   a support element comprising a first fixed end and a second fixed end, with the first fixed end pivotally connected to the support plane of the display module to let the display module rotate relative to the support element; with the second fixed end pivotally connected to the rear end of the base to let the support element rotate relative to the base;

wherein when the display module is opened and rotated to a suitable angle relative to the base via the second fixed end of the support element, the display module further rotates around the first fixed end with the first fixed end serving as a pivot point and simultaneously drives the connecting end to move from the second area towards the first area to a suitable position along with the sliding element; and, then, the display module is supported by the support element to keep a suitable tilted angle.

2. The portable computer as claimed in claim 1, wherein the first area is disposed with a keyboard.

3. The portable computer as claimed in claim 1, wherein the support element has a length not smaller than a distance between the connecting end of the display module and the first fixed end of the support element.

4. The portable computer as claimed in claim 1, wherein the sliding element comprises a pivoting portion for the connecting end of the display module to be pivotally connected to the sliding element therewith.

5. The portable computer as claimed in claim 4, wherein the sliding element further comprises a sliding portion and a connecting portion, wherein the sliding portion is connected to the pivoting portion via the connecting portion; and wherein the guiding structure is provided for disposing the sliding portion.

6. The portable computer as claimed in claim 5, wherein the base further comprises a surface having a slit, wherein the guiding structure is disposed below the surface, wherein the connecting portion of the sliding element goes through the slit to protrude the pivoting portion and a portion of the connecting portion out of the surface; and wherein the slit has a width smaller than that of the sliding portion and not smaller than that of the connecting portion.

7. The portable computer as claimed in claim 6, wherein the pivoting portion and the surface of the base are spaced apart by a spacing.

8. The portable computer as claimed in claim 7, wherein the sliding element further comprises at least one retaining portion for retaining the surface when the sliding element is moving and for keeping the spacing between the pivoting portion and the surface.

9. The portable computer as claimed in claim 8, wherein the retaining portion is a cam or a roller structure.

10. The portable computer as claimed in claim 5, wherein the sliding portion is a sliding block structure; and wherein the guiding structure is a groove-like slide rail for the sliding block structure to move in the groove-like slide rail.

11. The portable computer as claimed in claim 5, wherein the sliding portion is an inverse-T slide column structure; and wherein the guiding structure is a groove-like slide rail having at least one hollow groove for disposing a part of the inverse-T slide column structure therein to stabilize a sliding movement of the sliding portion.

12. The portable computer as claimed in claim 1, wherein when the display module overlaps with the base in a closed state, the connecting end of the display module and the second fixed end of the support element remain on a same axis.

13. The portable computer as claimed in claim 1, wherein when the display module overlaps with the base in a closed state, the connecting end of the display module and the second fixed end of the support element are respectively on different axes substantially parallel with each other.

14. The portable computer as claimed in claim 6, wherein the surface having the slit is the second area; and wherein the guiding structure is disposed correspondingly below the surface of the second area corresponding to the slit.

15. The portable computer as claimed in claim 6, wherein the surface having the slit comprises the second area and at least part of or all of the first area; and wherein the guiding structure is disposed correspondingly below the surface comprising the second area and at least part of the first area corresponding to the slit.

16. The portable computer as claimed in claim 1, wherein the sliding element is rotatably and pivotally combined with the connecting end of the display module.

17. A portable computer comprising:

a base comprising, between a front end and a rear end, a first area disposed at a front side of the base and a second area disposed at a rear side of the base;

a display module comprising a connecting end, a display face, and a support plane opposite to the display face; and at least one support element, with each support element comprising a first fixed end a second fixed end, with the first fixed end pivotally connected to a plane of the display module other than the display face to let the display module rotate relative to the support element; with the second fixed end pivotally connected to the rear end or a proximity of the rear end of the base to let the support element rotate relative to the base;

at least one sliding assembly, with each sliding assembly comprising a sliding element and a guiding structure, wherein the guiding structure is at least disposed in the second area of the base, wherein the sliding element is combined with the connecting end of the display module, and wherein the sliding element slides along the guiding structure;

wherein when the display module is opened and rotated to a suitable angle relative to the base via the second fixed ends of the at least one support element, the display module further rotates around the first fixed ends of the at least one support element with the first fixed ends serving as a pivot point and drives the connecting end to move from the second area towards the first area to a suitable position along with the sliding element; and, then, the display module is supported by the at least one support element to keep a suitable tilted angle.

18. The portable computer as claimed in claim 17, wherein the first area is disposed with a keyboard.

19. The portable computer as claimed in claim 17, wherein each one of the support element has a length not smaller than a distance between the connecting end of the display module and the first fixed end of the support element.

20. The portable computer as claimed in claim 17, wherein the sliding element comprises a pivoting portion for the connecting end of the display module to be pivotally connected to the sliding element therewith.

21. The portable computer as claimed in claim 20, wherein the sliding element further comprises a sliding portion and a connecting portion, wherein the sliding portion is connected to the pivoting portion via the connecting portion; and wherein the guiding structure is provided for disposing the sliding portion.

22. The portable computer as claimed in claim 21, wherein the base further comprises a surface having a slit, wherein the guiding structure is disposed below the surface corresponding to the slit, wherein the connecting portion of the sliding element goes through the slit to protrude the pivoting portion and a portion of the connecting portion out of the surface; and wherein the slit has a width smaller than that of the sliding portion and not smaller than that of the connecting portion.

23. The portable computer as claimed in claim 22, wherein the pivoting portion and the surface of the base are spaced apart by a spacing.

24. The portable computer as claimed in claim 23, wherein the sliding element further comprises at least one retaining portion for retaining the surface when the sliding element is moving and for keeping the spacing between the pivoting portion and the surface.

25. The portable computer as claimed in claim 24, wherein the retaining portion is a cam or a roller structure.

26. The portable computer as claimed in claim 21, wherein the sliding portion is a sliding block structure; and wherein the guiding structure is a groove-like slide rail for the sliding block structure to move in the groove-like slide rail.

27. The portable computer as claimed in claim 21, wherein the sliding portion is an inverse-T slide column structure; and wherein the guiding structure is a groove-like slide rail having at least one hollow groove for disposing a part of the inverse-T slide column structure therein to stabilize a sliding movement of the sliding portion.

28. The portable computer as claimed in claim 17, wherein when the display module overlaps with the base in a closed state, the connecting end of the display module and the second fixed end of the support element remain on a same axis.

29. The portable computer as claimed in claim 17, wherein when the display module overlaps with the base in a closed state, the connecting end of the display module and the second fixed end of the support element are respectively on different axes substantially parallel with each other.

30. The portable computer as claimed in claim 22, wherein the surface having the slit comprises the second area; and wherein the guiding structure is disposed correspondingly below the surface of the second area corresponding to the slit.

31. The portable computer as claimed in claim 22, wherein the surface having the slit comprises the second area and at least part of or all of the first area; and wherein the guiding structure is disposed correspondingly below the surface comprising at least part of the second area and the first area corresponding to the slit.

32. The portable computer as claimed in claim 17, wherein the at least one support element comprises two parallel support elements.

33. The portable computer as claimed in claim 17, wherein the at least one sliding assembly comprises two parallel, spaced apart sliding assemblies, wherein the guiding structures are parallel disposed at least in the second area, and wherein each sliding element is pivotally disposed at a position of the connecting end of the display module corresponding to one guiding structure respectively.

34. The portable computer as claimed in claim 17, wherein the at least one sliding assembly comprises a single sliding assembly disposed at the central position of at least the second area of the base; wherein the guiding structure is disposed in at least the second area of the base, and wherein the sliding element is correspondingly disposed at the central position of the connecting end of the display module.

35. The portable computer as claimed in claim 17, wherein the sliding element is rotatably and pivotally combined with the connecting end of the display module.

* * * * *